United States Patent [19]
Lee

[11] Patent Number: 5,921,819
[45] Date of Patent: Jul. 13, 1999

[54] BACKLIGHT INCLUDING A REPLACEABLE LIGHT TUBE FOR A LIQUID CRYSTAL DISPLAY

[75] Inventor: Ik-Soo Lee, Kyungki-do, Rep. of Korea

[73] Assignee: Samsung Electronics Co., Ltd., Suwon, Rep. of Korea

[21] Appl. No.: 08/715,793

[22] Filed: Sep. 19, 1996

[30]      Foreign Application Priority Data

Sep. 19, 1995 [KR]  Rep. of Korea ...................... 95-30788

[51] Int. Cl.[6] .................................................. G02F 1/1335
[52] U.S. Cl. ............................................. 439/698; 349/65
[58] Field of Search ................................... 439/619, 612, 439/698, 232; 349/58, 61, 62, 63, 64, 65, 70

[56]               References Cited

U.S. PATENT DOCUMENTS

| 2,984,813 | 5/1961 | Bossi ........................................ 439/619 |
| 3,210,532 | 10/1965 | Woofter ................................. 439/698 |
| 3,436,716 | 4/1969 | Amis, Jr. et al. ........................ 439/232 |
| 3,633,149 | 1/1972 | Maltais ..................................... 439/698 |
| 3,783,437 | 1/1974 | Graff et al. .............................. 439/619 |
| 4,017,155 | 4/1977 | Yagi et al. ................................. 349/65 |
| 4,655,553 | 4/1987 | Klein ......................................... 349/58 |
| 5,192,127 | 3/1993 | Schaef ..................................... 439/356 |
| 5,288,249 | 2/1994 | Fitzgerald ............................... 439/698 |
| 5,422,751 | 6/1995 | Lewis et al. .............................. 349/65 |
| 5,572,342 | 11/1996 | Higuchi et al. ........................... 349/62 |

*Primary Examiner*—Neil Abrams
*Attorney, Agent, or Firm*—Jones Volentine, L.L.P.

[57]                ABSTRACT

An easily replaceable backlight includes a light section having wires extending from either end thereof which are detachably joined to a connecting body. The connecting body includes wires which are joined with a power connector. The contacting part is between the wires of the light section and the wires of the connecting body are securely fixed. Such fixing may be achieved using an openable-closeable mold frame. Thus, the configuration eliminates welding of the wires of the light section to the wires of the connecting body. Therefore, when the light source needs to be changed, only the part directly attached to the light source has to be changed.

3 Claims, 3 Drawing Sheets

BACKLIGHT INCLUDING A REPLACEABLE LIGHT TUBE FOR A LIQUID CRYSTAL DISPLAY

BACKGROUND OF THE INVENTION

1. Field of the Invention

The present invention relates to a backlight. More particularly, this invention relates to a backlight in a liquid crystal display.

2. Description of the Related Art

Generally, a backlight includes a luminating section and a light guide section. The luminating section of the backlight emits light and the light guide section of the backlight guides the light that is emitted from the luminating section of the backlight.

A conventional backlight will now be described specifically with reference to the attached drawings.

FIG. 1 shows a conventional backlight and FIG. 2 shows the luminating section of a conventional backlight.

As shown in FIG. 1, a luminating section 100 in a conventional backlight is at the side of a light guide section 200. A lamp 16 of the luminating section 100 has conducting wires (not visible in FIG. 1). The conducting wires of the lamp 16 are connected to exposed portions of wires 24 of a connector 26. The connecting points of the conducting wires of the lamp 16 and the exposed portions of the wires 24 of the connector 26 are covered with a rubber-holder 14.

In this case, the conducting wires of the lamp 16 are connected to the wires 24 of the connector 26 by welding or clapping. The term "clapping" has an art recognized meaning as a method for fastening the two wires.

Referring to FIG. 2, a luminating section of a conventional backlight will be described in detail.

As shown in FIG. 2, a lamp 16 has conducting wires 12 at both ends. Connector 26 has wires 24 with exposed ends 22. A rubber-holder 14 covers the connecting point of the conducting wires 12 of the lamp 16 and the exposed portion 22 of the wires 24 of the connector 26. Accordingly, the rubber-holder 14 insulates them from the outside.

In the above conventional backlight, the lamp 16 emits light by the electrical energy supplied through the conducting wires 12 and 24, and the light emitted from the lamp is transmitted to the light guide section 200.

However, the above-described conventional backlight has some problems.

In the conventional backlight, the conducting wires of the lamp are fixed in the rubber-holder and are connected to the wires of the connector in the rubber-holder. Since the two wires are connected to each other by welding or clapping for stability, it is hard to disassemble them once they are assembled.

Therefore, when the lamp becomes burned out or is broken, or when it is necessary to change the lamp, the lamp alone cannot be changed. Instead, such an arrangement requires the luminating section itself to be changed.

SUMMARY OF THE INVENTION

An object of the present invention is to provide a backlight having at least one component that is easy to replace.

In order to achieve this object, a backlight according to the present invention comprises:

a conducting body connected to a light source;

a connecting body connected to a power supply and electrically connected to the conducting body;

means for reversibly connecting the conducting body of said light source to the connecting body of said power supply.

In the present invention, since the conducting body and the connecting body are reversibly connected to each other but remain separate members, when the light source needs to be changed only the part directly attached to the light source needs to be changed along with the light source rather than the whole assembly.

DESCRIPTION OF THE PREFERRED EMBODIMENT

The above objects and advantages of the present invention will become more apparent by a detailed description below of preferred embodiments and by reference to the attached drawings.

Figure 1:
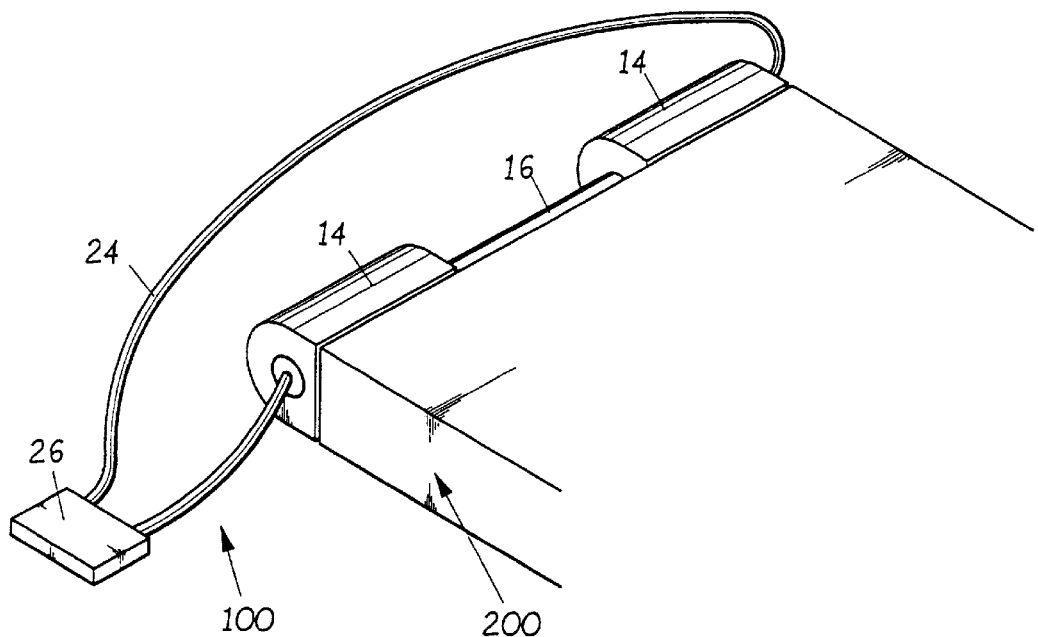
FIG. 1 shows a conventional backlight.
Figure 2:
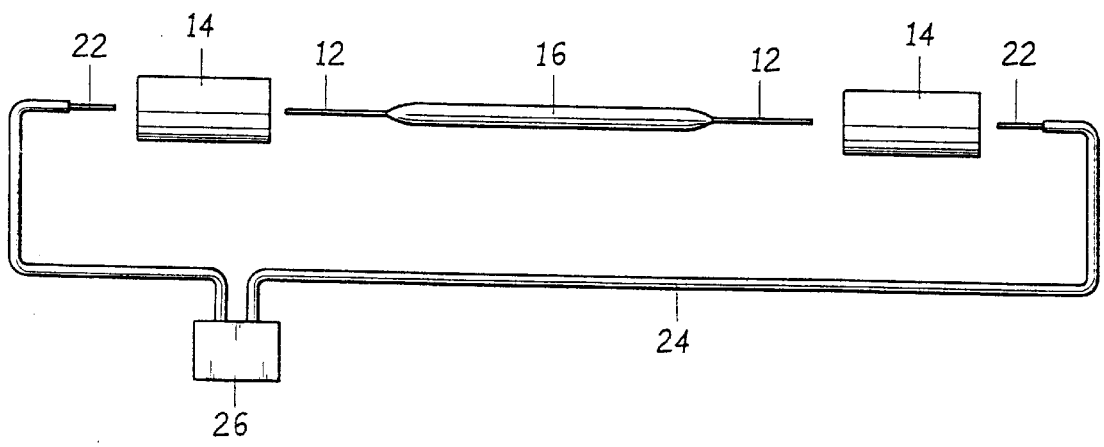
FIG. 2 shows the ruminating section of a conventional backlight.
Figure 3:
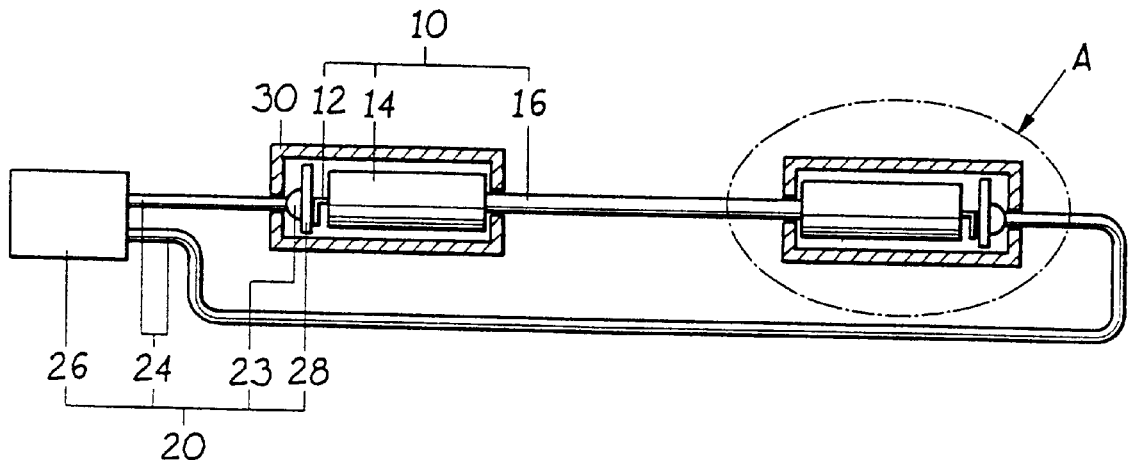
FIG. 3 shows a backlight according to a preferred embodiment of the present invention.

FIG. 3 shows a backlight according to a preferred embodiment of the present invention. As shown in FIG. 3, a backlight according to a preferred embodiment of the present invention includes a light guide section (not shown) and a luminating section at the side of the light guide section. Only the luminating section is shown in FIG. 3.

In the luminating section, a lamp section 10 is connected to a conducting wire section 20. The part connecting the lamp section 10 to the conducting wire section 20 is fixed by a mold-frame 30.

Rubber holders 14 are formed at the ends of a lamp 16 in the lamp section 10. Conducting wires or bodies 12 connected to the ends of the lamp 16 are passed through the rubber-holder 14 and exposed outside of the rubber-holder 14. Preferably, the ends of the conducting wires 12 are bent at approximately a 90 degree angle 14 to form a contact member.

Wires or bodies 24 are connected to a connector 26 in the conducting wire section 20. The connector 26 will be connected to a power supply (not shown). The exposed portions 22 of the wires 24 are welded firmly to connecting bodies 28. The connector 26 is electrically connected to the connecting bodies 28. The connecting bodies 28 are preferably PCBs (printed circuit boards) or made of a conductive metal.

The conducting wires 12 at the ends of the lamp section 10 electrically contact the connecting bodies 28 of the conducting wire section 20. The connecting bodies 28, the conducting wires 12 of the lamp section 10 and the rubber-holders 14, preferably, are all covered with the mold-frame 30. Therefore, the contact of the connecting bodies 28 and the conducting wires 12 of the lamp section 10 are securely fixed in contact with one another.

Figure 4:
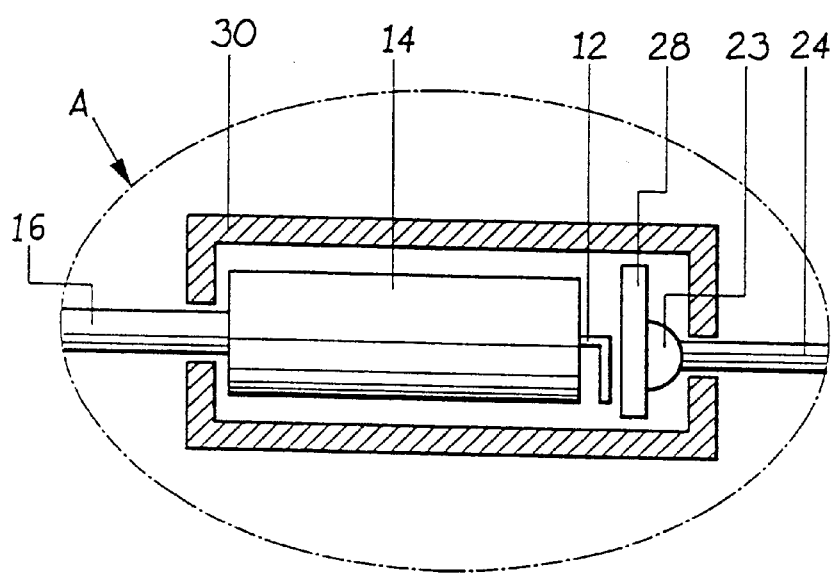
FIG. 4 is a enlarged diagram of the part A in FIG. 3, which illustrates a manner by which the lamp section is attached reversibly to the conducting wire section.

FIG. 4 is an enlarged diagram of the part A in FIG. 3, in which the lamp section is attached to the conducting wire section.

As shown in FIG. 4, one end of the lamp 16 is connected to the conducting wire 12. The end of the lamp 16 and the part of the conducting wire 12 are covered with the rubber-holder 14. In this embodiment, the conducting wire 12 is exposed outside of the rubber-holder 14 and is bent at approximately a 90° angle to form a contact member. However, in other embodiments of the invention other contact members may be utilized such as a contact member which comprises a spring member, wherein the contact member is attached to conducting wire 12, for example. The conducting wire 12 is adapted to contact the connecting body 28. The connecting body 28 is firmly attached (preferably by being welded and the like) to the exposed portion 22 of wire 24. This contacting portion of connecting body 28, which may be connected to exposed portion 22 by welding, is indicated as 23 in FIG. 4. The contact region which extends from the end of the lamp 16 to the conducting wire section 20 is covered with the mold-frame 30, which holds the members securely fixed in contact with one another. Thus, the lamp section 10 is securely contacted with the conducting wire section 20 by the mold-frame. In a preferred embodiment, mold-frame 30 is comprised of at least two portions adapted to provide the mold-frame in an open or closed position with respect to the two portions and further comprises a means for reversibly opening and closing the two portions.

Figure 5A:
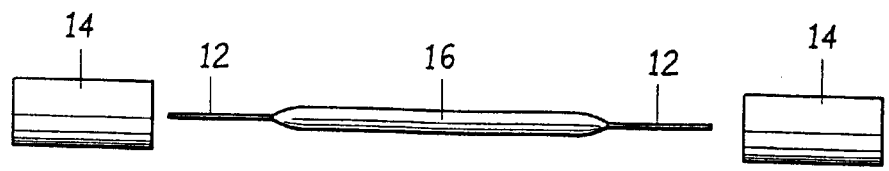
FIGS. 5A and 5B show the steps for manufacturing a lamp section of a backlight.
Figure 5B:
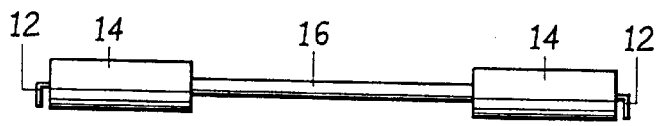

FIGS. 5A and 5B each show the steps to manufacture a lamp section of a backlight according to the present invention.

As shown in FIG. 5A, a lamp section includes two rubber-holders 14 and a lamp 16 which is connected to conducting wires 12. The conducting wires 12 are fixed into the rubber-holders 14, then the holders 14 are contacted at both ends of the lamp 16 by allowing the wires 12 to pass through the holders 14. The portion of the conducting wires 12, that passed through the rubber-holders 14 may be bent at approximately 90 degree angles to form contacts, as in shown FIG. 5B. Alternatively, other members may be appended to conducting wires 12 and be utilized as contacts with members 28 of FIG. 4.

Figure 6:
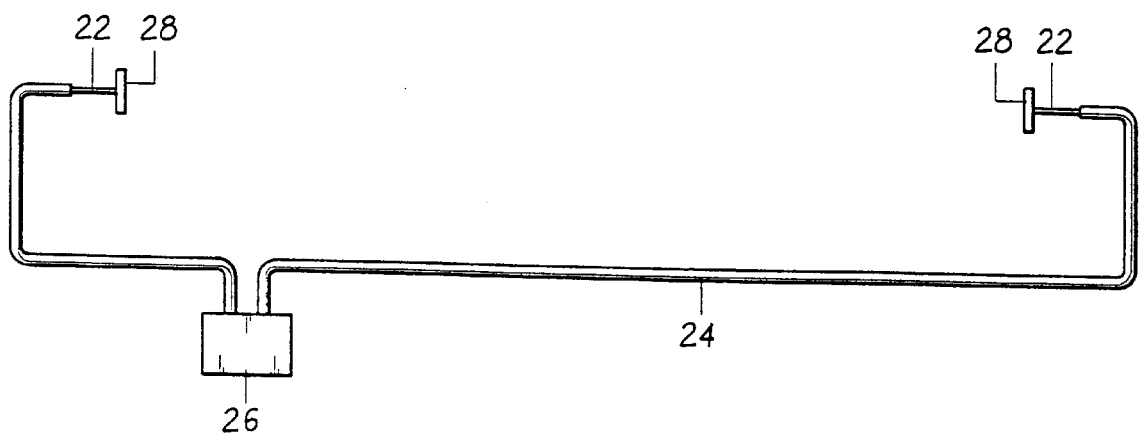
FIG. 6 shows the step for manufacturing a conducting wire section of a backlight.

FIG. 6 shows the step to manufacture a conducting wire section of a backlight to provide connecting bodies 28, which are attached to exposed portion 22 of wire 24.

As shown in FIG. 6, there are wires 24 connected to a connector 26 in a conducting wire section. The connector 26 will be connected to a power supply. Bare portions 22 are exposed at the ends of the wires 24. The bare portions 22 are connected to connecting bodies 28 by welding. This connection is electrical connected and secure.

In the present invention, since the conducting body of the lamp and the second conducting body are reversibly attached but remain separated from each other, when the light source needs to be changed only the part directly attached to the light source has to be changed. Therefore, the backlight according to the present invention increases productivity and reduces manufacturing or repair expenses.

The present invention has been described in detail with reference to the above preferred embodiments, but the present invention is not restricted to such embodiments. It is clearly contemplated and understood that many variations are possible within the scope and spirit of the present invention by persons who are skilled in the art. Further, such variations are intended to be within the scope of the invention and within the scope of the appended claims.

What is claimed is:

1. A backlight of a liquid crystal display, comprising:

a conducting body connected to a light tube, the conducting body having two ends which extend out from opposite ends of said light tube located adjacent to a side of a light guide section of the liquid crystal display;

a connecting body capable of being connected to a power supply and electrically connected to the conducting body, the connecting body being in contact with both ends of the conducting body; and means for reversibly connecting the separate conducting body member of said light source to the separate connecting body member to said power supply.

2. The backlight as defined in claim 1, wherein the connecting means is a mold-frame which covers and holds the conducting body of said light source and the connecting body of said power supply in electrical contact with each other.

3. The backlight as defined in claim 2, wherein said mold-frame comprises two portions which are operable to receive parts to be housed therein and closeable to surround said parts.

* * * * *